(12) United States Patent
Hansen et al.

(10) Patent No.: US 12,333,611 B1
(45) Date of Patent: *Jun. 17, 2025

(54) DIGITAL IMAGERY, AUDIO, AND META-DATA

(71) Applicant: United Services Automobile Association (USAA), San Antonio, TX (US)

(72) Inventors: Gregory David Hansen, Helotes, TX (US); Andre R. Buentello, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,538

(22) Filed: Mar. 18, 2024

Related U.S. Application Data (63) Continuation of application No. 17/224,892, filed on Apr. 7, 2021, now Pat. No. 11,935,125, which is a
(Continued)

(51) Int. Cl.
  *G06Q 40/08* (2012.01)
  *G06N 5/025* (2023.01)
  *G06Q 20/40* (2012.01)

(52) U.S. Cl.
  CPC .............. *G06Q 40/08* (2013.01); *G06N 5/025* (2013.01); *G06Q 20/4016* (2013.01);
(Continued)

(58) Field of Classification Search
  CPC .... G06Q 40/08; G06Q 20/4016; G06N 5/025; H04N 2201/3228; H04N 2201/3252; H04N 2201/3253
  See application file for complete search history.

(56) References Cited

U.S. PATENT DOCUMENTS 7,827,045 B2 * 11/2010 Madill, Jr. ............. G06Q 40/08
                                                    705/4
8,260,639 B1    9/2012 Medina et al.
(Continued)

FOREIGN PATENT DOCUMENTS

CA    3034939 A1 * 10/2019 ......... G06Q 20/3223
EP    2667335 A1 * 11/2013 ............. G06Q 10/06
(Continued)

OTHER PUBLICATIONS

Boyer, Michael, H.: Fighting Fraud with Metadata, Sep. 4, 2015, Property Casualty 360, pp. 1-12 (Year: 2015).*
(Continued)

*Primary Examiner* — Bijendra K Shrestha
(74) *Attorney, Agent, or Firm* — Fletcher Yoder, P.C.

(57) ABSTRACT

Methods, systems, and apparatus, including computer programs encoded on computer storage media, to process audio and visual data. One of the methods includes receiving, from a mobile device, image data and audio data, wherein the image data and audio data were obtained within the same time frame. The method includes processing the image data to identify a first set of facts. The method includes processing the audio data to identify a second set of facts. The method includes processing meta-data associated with the image data to identify a third set of facts. The method also includes performing at least one process using the first set of facts, the second set of facts, and the third set of facts.

18 Claims, 5 Drawing Sheets

Related U.S. Application Data continuation of application No. 15/689,918, filed on Aug. 29, 2017, now Pat. No. 11,017,477.

(60) Provisional application No. 62/384,354, filed on Sep. 7, 2016.

(52) U.S. Cl.
CPC ............... *H04N 2201/3228* (2013.01); *H04N 2201/3252* (2013.01); *H04N 2201/3253* (2013.01)

(56) References Cited

U.S. PATENT DOCUMENTS

| | | | |
|---|---|---|---|
| 8,571,895 B1* | 10/2013 | Medina, III | G06Q 40/08 705/4 |
| 9,405,981 B2 | 8/2016 | Li et al. | |
| 9,721,302 B2* | 8/2017 | Tofte | G06Q 40/08 |
| 9,824,453 B1 | 11/2017 | Collins et al. | |
| 10,083,487 B1 | 9/2018 | Veliche | |
| 10,304,137 B1* | 5/2019 | Genser | G06Q 40/08 |
| 10,387,960 B2 | 8/2019 | Tofte et al. | |
| 10,430,886 B1 | 10/2019 | Brandmaier et al. | |
| 10,482,464 B1 | 11/2019 | Dietrich et al. | |
| 10,580,075 B1* | 3/2020 | Brandmaier | G06Q 40/08 |
| 2003/0233261 A1* | 12/2003 | Kawahara | G06Q 40/08 705/4 |
| 2005/0038682 A1* | 2/2005 | Gandee | G06Q 30/06 705/4 |
| 2009/0106052 A1* | 4/2009 | Moldovan | G06Q 20/10 705/1.1 |
| 2009/0234678 A1 | 9/2009 | Arenas | |
| 2010/0228656 A1* | 9/2010 | Wasserblat | G06Q 40/03 705/35 |
| 2011/0058048 A1* | 3/2011 | Elazar | H04N 1/32101 348/207.1 |
| 2012/0003956 A1 | 1/2012 | Austin et al. | |
| 2014/0244312 A1* | 8/2014 | Gray | G06Q 40/08 705/4 |
| 2015/0049914 A1 | 2/2015 | Alves | |
| 2015/0142681 A1 | 5/2015 | Schneider | |
| 2015/0186497 A1 | 7/2015 | Patton et al. | |
| 2016/0342834 A1 | 11/2016 | Ragnet et al. | |
| 2017/0228825 A1* | 8/2017 | Dhaliwal | G06Q 40/08 |
| 2017/0352104 A1* | 12/2017 | Hanson | G06Q 40/08 |
| 2018/0048945 A1 | 2/2018 | Al Mohizea | |

FOREIGN PATENT DOCUMENTS

| | | | | |
|---|---|---|---|---|
| KR | 2015-0132726 A | * | 11/2015 | ............. G06Q 40/08 |
| WO | 2006126183 A2 | | 11/2006 | |
| WO | WO-2010010404 A2 | * | 1/2010 | ........... G06F 19/321 |
| WO | 2012012247 A1 | | 1/2012 | |

OTHER PUBLICATIONS

Boyer, Michael, H.: Fighting Fraud with Metadata, Sep. 4, 2015, PropertyCasualty360, pp. 1-12 (Year:2015) (Year: 2015).*

ITS International: Pioneering sensors colect weather data from moving vehicles, Jan. 20, 2012, pp. 1-4 (Year: 2012).*

Vermonts Traffic Records Coordination Committee (TRCC): Investigator's Guide For Completing the State of Vermont Uniform Crash Report, May 2014, Final Version 1.5, pp. 1-114. (Year: 2014).

Boyer, Michael, H.: Fighting Fraud with Metadata, Sep. 4, 2015, PropertyCasualty360, pp. 1-7 (Year: 2015).

Banarescu, A.: Detecting and Preventing Fraud with Data Analytics, 2015, Precedia Economics and Finance, 32, pp. 1827-1836 (Year: 2015).

Kompani Risk & Insurance Solutions, Inc.: Fighting Fraud with Metadata, Sep. 23, 2015, pp. 1-4 (Year: 2015).

Viaene et al.: Strategies for Detecting Fraudulent Claims in the Automobile Insurance Industry, 2007, European Journal of Operational Research, 176, ScienceDirect, pp. 565-583 (Year: 2007).

Guo, Lijia: Applying Data Mining Techniques in Property/Casualty Insurance, Feb. 28, 2003, pp. 1-25 (Year: 2003).

* cited by examiner

DIGITAL IMAGERY, AUDIO, AND META-DATA

CLAIM OF PRIORITY

This application is a continuation of and claims priority to U.S. patent application Ser. No. 17/224,892, entitled "DIGITAL IMAGERY, AUDIO, AND META-DATA," filed on Apr. 7, 2021, which claims priority to and the benefit of U.S. patent application Ser. No. 15/689,918, filed Aug. 29, 2017, titled "DIGITAL IMAGERY, AUDIO, AND META-DATA," which is the non-Provisional application of and claims priority to U.S. provisional Patent Application Ser. No. 62/384,354, filed on Sep. 7, 2016, the entire contents of which is hereby incorporated by reference.

BACKGROUND

Images and audio files can store meta-data. For example, the exchangeable image file format (officially Exif) is a standard that specifies the formats for images, sound, and ancillary tags used by digital cameras (including smartphones), scanners and other systems handling image and sound files recorded by digital cameras. The data can include geolocation and time stamps.

SUMMARY

This specification describes technologies relating to imagery and audio processing.

In general, one innovative aspect of the subject matter described in this specification can be embodied in methods that include the act of receiving, from a mobile device, image data and audio data, wherein the image data and audio data were obtained within the same time frame. The methods include the act of processing the image data to identify a first set of facts. The method includes the act of processing the audio data to identify a second set of facts. The method includes the act of processing meta-data associated with the image data to identify a third set of facts. The method also includes the act of performing at least one process using the first set of facts, the second set of facts, and the third set of facts.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. Performing the at least one process may include generating an insurance claim using facts selected from the first set of facts, the second set of facts, and the third set of facts. The image data may include at least one image of damage to a vehicle and the audio data includes a description of an insurance loss event. The methods may include the act of identifying potential fraud by comparing the facts in the first set of facts, the second set of facts, and the third set of facts. Processing the audio data may include generating a transcription of the audio data. The methods may include the acts of identifying the location of an accident based on the meta-data associated with the image data.

Particular embodiments of the subject matter described in this specification can be implemented so as to realize one or more of the following advantages. Customers may provide instant data to the company. The customer experience may be improved. Fraud may be detected.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A combination of a visual image coupled with an audio statement can be used by a computer system to extract a variety of different facts and facilitate interaction with an organization. For example, the user may point the camera of a mobile device (such as a smart phone, a tablet, notebook or other portable computer, a personal digital assistant, etc), take a picture, and make an audio recording that describes the user's interest in the picture. The mobile device may be configured to enable the user to make the audio recording while taking the picture. The combination of the image from the picture and the audio recording may be sent to the organizations computer system. The computer system can process the image and the audio recording to provide assistance to the user.

Figure 1:
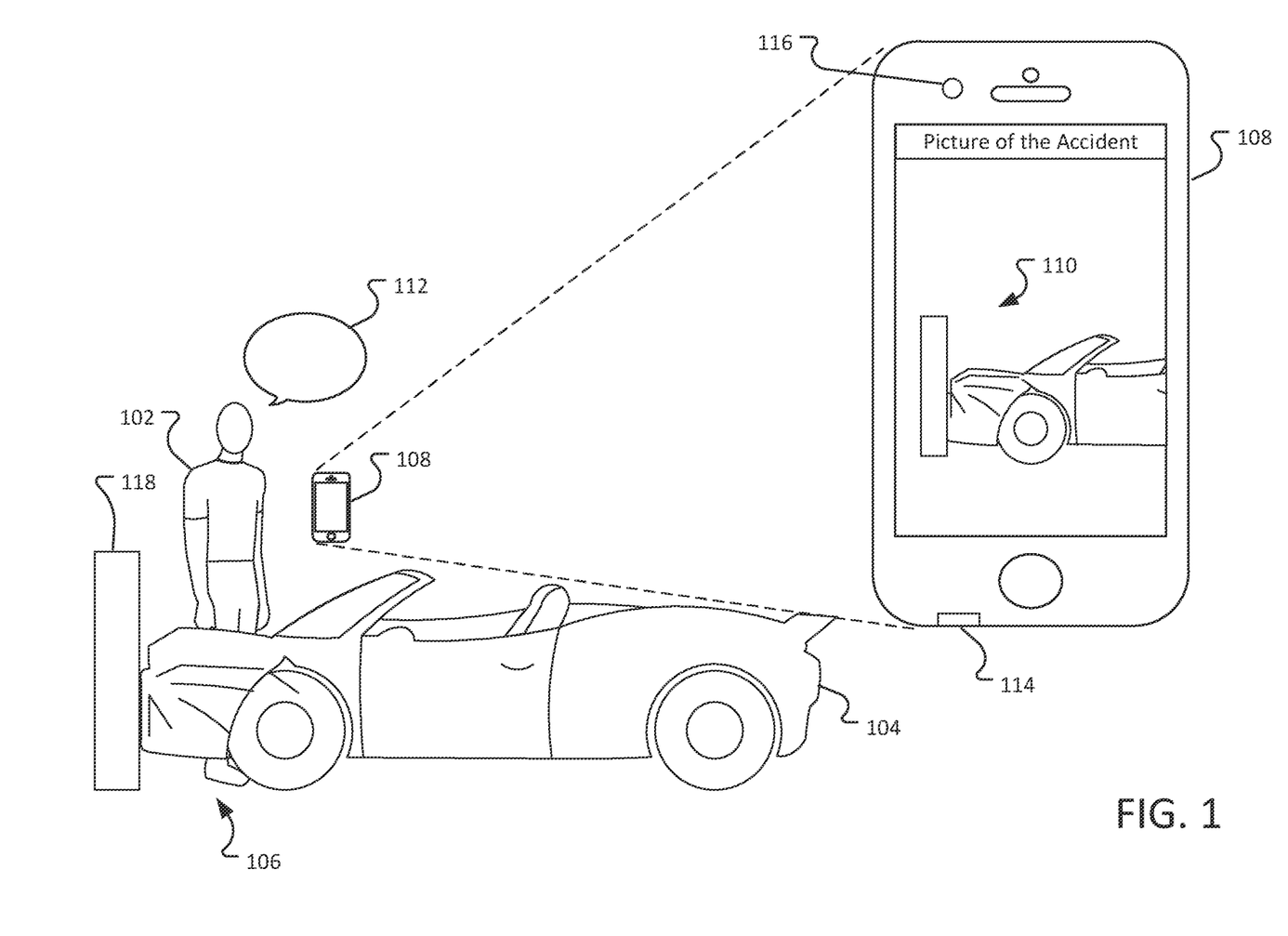
FIG. 1 illustrates an example of using an audio recording and images to report an accident.

FIG. 1 illustrates an example of using an audio recording and images to report an accident. A user 102 has crashed into a barrier 118 resulting in damage to the front 106 of a car 104. The user 102 can use a mobile device 108 to report the accident (for example, to an insurance company). The user may use an application installed on the mobile device 108 or the native functions of the mobile device 108 to take a picture 110 of the damage (for example, using a camera 116 on the mobile device 108). In scenarios involving multiple vehicles, the user 102 may take pictures of different vehicles involved in the accident. The user 102 may also take pictures of the other user's insurance cards, license plates, injuries, etc. The pictures taken by the user may be directed (for example, the application on the mobile phone may direct the user to take particular pictures) and/or undirected (for example, the user may take the pictured that he believes is most relevant).

The user 102 may speak 112 during the process of taking pictures. For example, the user 102 may explain what happened, who is involved, whether he, or anyone else, is injured, the weather conditions, etc. The user's 102 speech may be directed (for example, the application on the mobile phone may ask the user 102 questions) and/or the user's speech may be free form. The mobile device 108 may record the speech 112, for example, using a microphone 114 on the mobile device 108.

In some implementations, the user 102 may make any kind of audio visual recording (for example, a movie).

Figure 2:
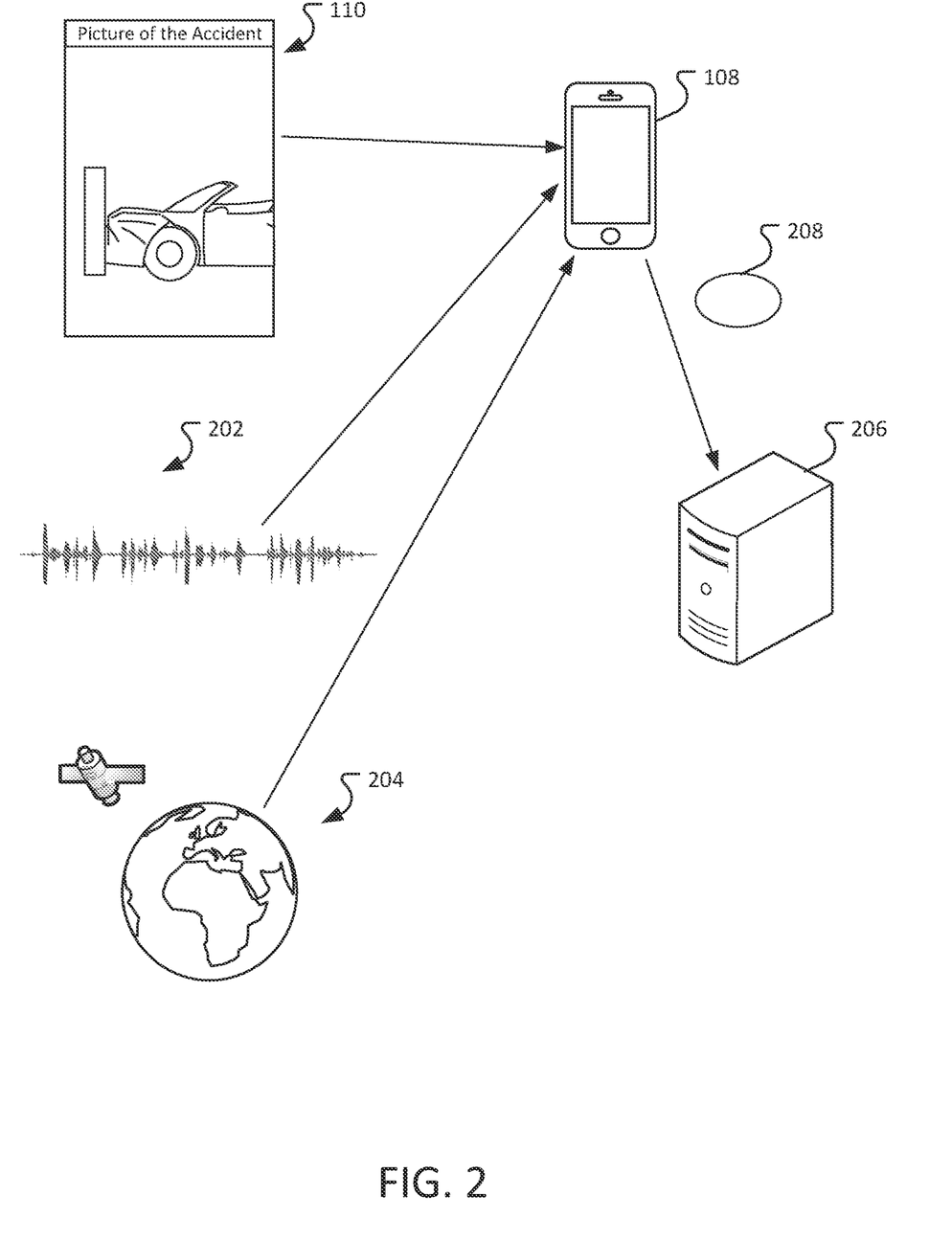
FIG. 2 illustrates combining data and providing it to an entity.

FIG. 2 illustrates combining data and providing the data to an entity. The picture 110, an audio recording 202 of the user's speech 112 of FIG. 1, and other data provided by the mobile device 108 (such as global positioning system (GPS) location 204) can be combined by the mobile device 108 and send in a data package 208 to a computer system 206 of an entity (such as an insurance company). The data package 208 may include both primary data (such as the audio recording 202 and the picture 110) and may also include meta-data associated with the primary data. For example, the picture may have a time-stamp, a GPS location, etc.).

The data package 208 may be provided using TCP/IP (for example, over a cellular network or wireless network). The data package 208 may be sent securely using various encryption protocols, including SSL. In some implementations, the data package 208 may be encrypted using public key encryption or symmetric key encryption. The data in the data package 208 may be compressed using any number of compression algorithms in order to reduce the amount of network bandwidth required to send the data package.

The computer system 206 may extract data from the data package and begin processing the data. In some implementations, the data may be sent separately. For example, the audio recording may be sent separately from the images.

In some implementations, the computer system 206 may identify one or more relevant activities or processes to be performed based on information provided by the mobile device. For example, the mobile device may execute a specific function or request the execution of a specific function on the computer system 206, such as an accident report function.

In some implementations, the computer system 206 may identify one or more relevant activities or processes to be performed based on implicit information provided by the mobile device. For example, the computer system 206 may analyze the data provided by the mobile device and select processes accordingly. For example, the computer system 206 may accept the package as part of an accident report or may determine that the package relates to an accident based on its contents.

Processing the data may include using speech recognition technology to transcribe the audio recording. The transcribed audio recording maybe analyzed to extract relevant facts. The transcribed audio may be processed using machine learning algorithms, regular expression analysis, or other data extraction techniques.

Processing the data may include using image recognition technology to identify relevant facts. Image recognition can include object recognition. Object recognition refers to one or more different processes that identify object within an image, for example, people, cars, roads, street signs, buildings, bill boards, property, etc. Image recognition can include object identification. Object identification refers to the ability of a computer to recognize particular objects in an image. For example, object identification can include identification of a specific person's face, identification of handwritten digits, or identification of a specific vehicle. Image recognition technology can also include object detection. Object detection includes analyzing an image for specific conditions. Examples include detection of weather conditions (rain, snow, etc.) and road conditions (for example, a wet or icy street, potholes, construction, etc.)

The computer system may perform optical character recognition (OCR) on the image. OCR is the electronic conversion of images of typed, handwritten or printed text into machine-encoded text. Examples of text that may be included in the image can include, for example, license plate numbers, insurance information, driver's license information, streets signs, business signs, etc.

Facts that can be extracted include, but are not limited to, license plate numbers, individuals involved in the accident, indications of damage to the vehicle or vehicles, a law enforcement presence, the identification of the towing company that moves a vehicle, the conditions of the road (water, snow, etc. . . . ).

Processing the data may include extracting meta-data from other data in the package. For example, digital images may include a time stamp and a GPS location. Audio recordings may include a time stamp.

In some implementations the time stamp and GPS can be used to derive additional details not implicitly capture in the photograph, audio, or metadata. For example, with the time and location one could derive the weather conditions, traffic patterns, location of the sun, events occurring in the area, etc. These additional details could be used to gain a better understanding of the situation, and/or to identify fraudulent activities.

The system may catalog different photos based on the information they include. For example, the system may determine that an image includes a picture of damage to property, the image may be cataloged as associated with claimed damage. In some implementations, the image may be cataloged along with facts extracted from the meta-data. For example, based on a time stamp or GPS location.

The computer system 206 can use the use the facts to execute a transaction on behalf of the user. For example, the computer system 206 may begin an insurance claim using the facts.

The system can also use the facts as a fraud detection mechanism. For example, discrepancies between the audio statement of the user, the images provided by the user, and the other data received from the mobile device may trigger a fraud alert or investigation. For example, if the user's statement is that they are in one place, but the location data indicates they are somewhere else, the system may determine that there is a probability of fraud. Similarly, if the user's statement indicates that someone was driving the car, but that person does not appear in any photograph, the system may determine a likelihood of fraud. Similarly, the apparent damage to a vehicle may be compared to a repair bill provided at a later date. Inconsistencies between the apparent damage and the bill may trigger a fraud alert.

In some implementations, the fraud detection system may calculate a numeric quantity that represents the likelihood that fraud is occurring. The numeric quantity may be compared to a threshold value. If the numeric quantity exceeds the threshold value, the system may raise an alert. In some implementations, the system may raise an alert in response to any indication of fraud.

As described above additional information can be derived from the metadata, audio recording, and picture analysis. This data could be used to corroborate or refute a claim. For example, if wet roads were claimed as the cause of an accident, then the location and timestamp could be used to verify recent precipitation or identify a fraudulent claim.

Figure 3:
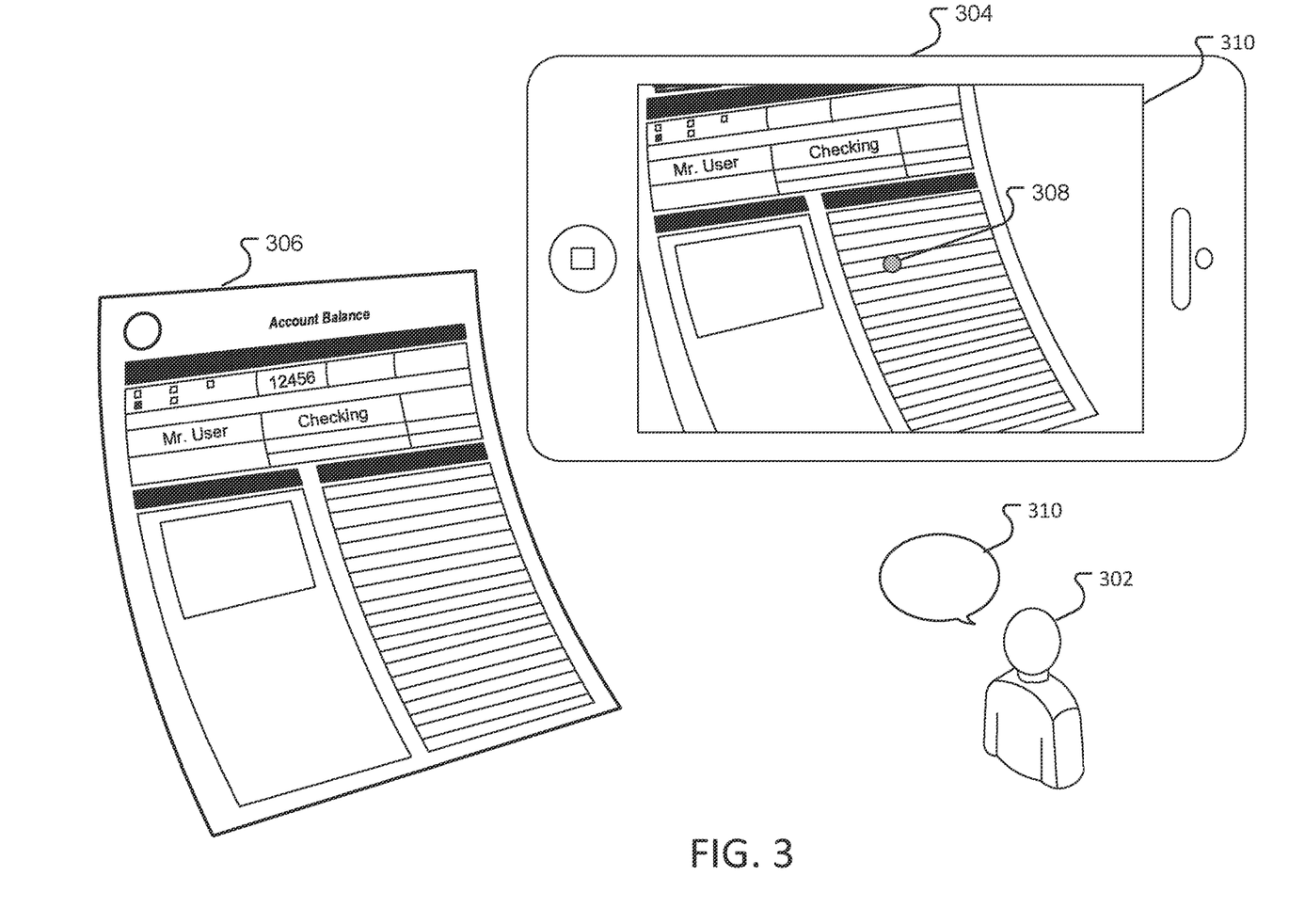
FIG. 3 illustrates an example of a user requesting assistance with an account statement.

The system can be used to handle other kinds of interactions. For example, FIG. 3 illustrates an example of a user requesting assistance with an account statement. A user 302 may use a mobile device 304 to take a picture (or use video functionality of the mobile device) of a statement 306 (or other document). In some implementations, the display 310 of the mobile device 306 may have a dot 308 or other reticle displayed over the image of the statement 306 in order to enable the user to more precisely focus on a particular portion of the statement 306.

In some implementations, the system may recognize the text of the form and use the text to determine both which document the user is pointing at and where the user is pointing in the document. The system may use the GPS location to determine where the user is located. Alternatively, the system may lookup user location information based on a user profile. This location information can be used to provide context for the document. (For example, an auto insurance statement may need different/additional information than a statement from New Jersey.)

While the user 302 takes the picture of the statement 306, the user may be speaking 310, describing the user's problem or question with the statement 306. The user's speech can be recorded by the mobile device 304, as described above.

Figure 4:
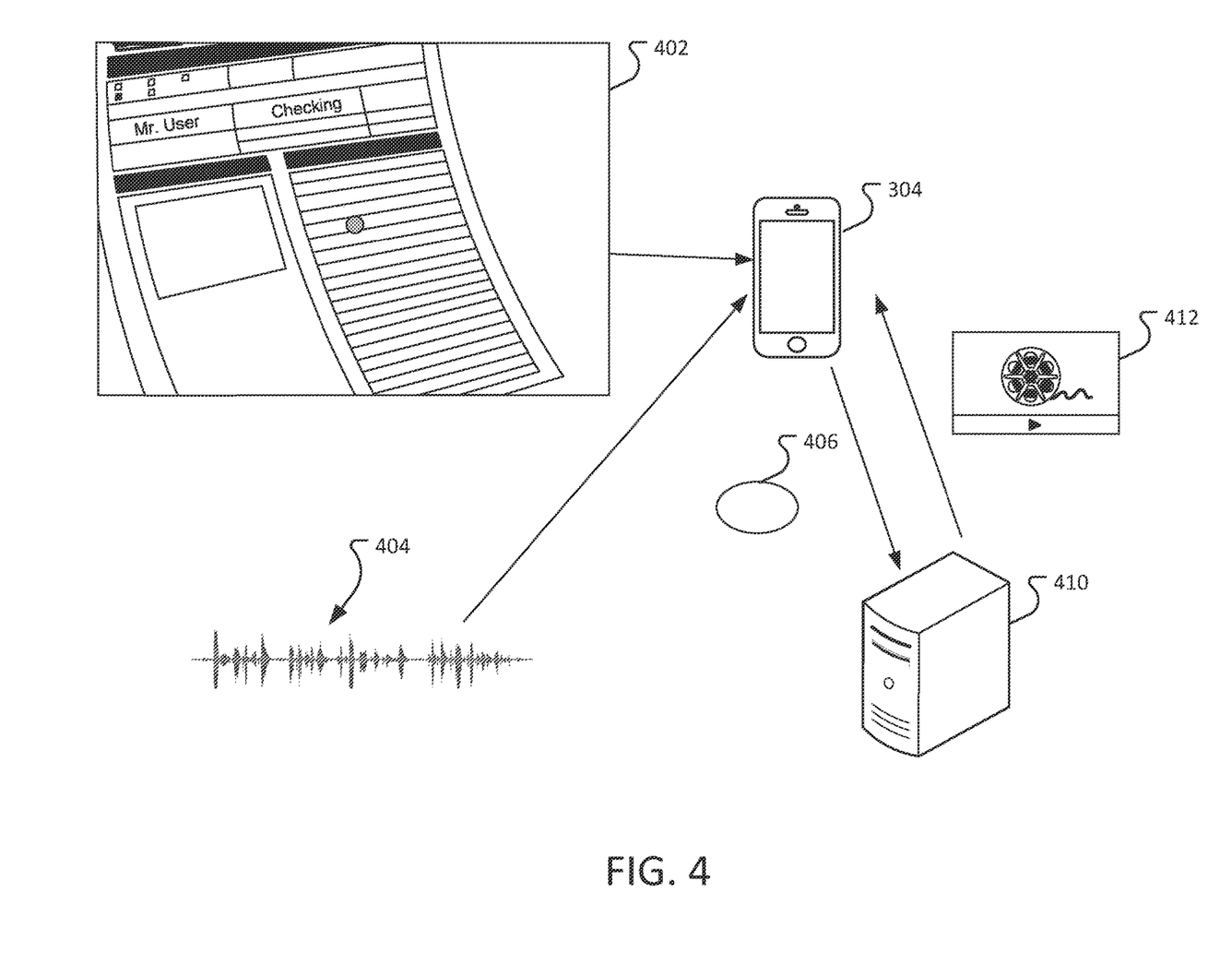
FIG. 4 illustrates an example of providing the image and audio recording to a computer system associated with the organization.

FIG. 4 illustrates an example of providing the image and audio recording to a computer system associated with the organization. The image and statement may be combined into a data package and sent to a computer system of the organization (not shown), as described above.

In this example, when the mobile device 304 combines the image 402 and the audio recording 404 of the users speech and sends the data package 406 to a computer system 410 of an organization. The computer system 410 can extract facts from the data package. As described above, the facts may be extracted using image processing, audio processing, and metadata analysis.

In this example, the extracted facts may include the type of statement the user is reviewing, the portion of the statement about which the user has a question, and the nature of the user's question (for example, the system may determine if the user does not understand what a particular line is or if the user believes that the data in the particular line is in error).

In some implementations, the system can initiate a video chat between the member and a customer service representative. The system may present the customer service representative with the transcript or text provided by the user. The customer representative may also be able to read the text the user is pointing at (for example, using the camera of a mobile device) while talking with the user.

The computer system can generate a personalized video 412 for the user that attempts to address the user's issue. For example, the video may explain what a particular line item means and may explain the particulars of the user's statement. In general, a personalized video 412 is a video that includes at least a portion of content that is particular to the user. The personalized video may display the user's statement while providing a stock explanation of the areas of interest. Alternatively, the video may be entirely personalized to the user, including custom audio that addresses the user's issue.

Figure 5:
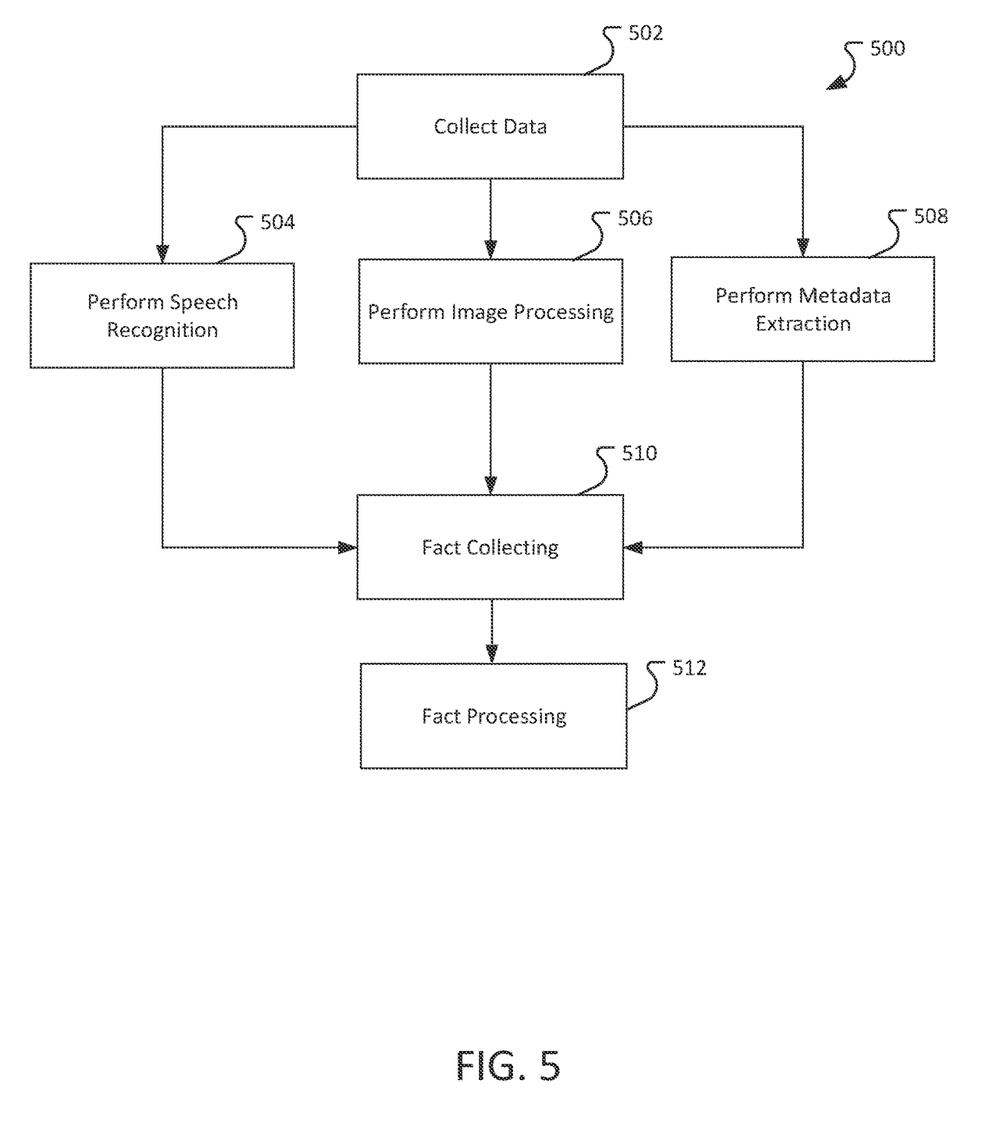
FIG. 5 is a flow chart of an example process for processing image and audio data.

FIG. 5 is a flow chart 500 of an example process for processing image and audio data. The process collects data 502. The data may be provided over a network, such as the Internet. The data may include audio visual content. In some implementations, the audio visual content may include images and audio recordings. The images and audio recording may be provided in a single container (such as a video) or in separate containers (such as audio file and image files). The collected data may include contextual clues that indicate what the user is attempting to do. For example, the data may be sent from a claim reporting application or from a help application on the user's device.

The process can perform 504 speech recognition on the audio files. Speech recognition can include generating a transcription of the audio file and parsing the transcription to identify facts.

The process can perform 506 image processing. The image processing can include identifying objects in the image, extracting text from the image, and establishing external conditions using the image.

The process can extract metadata 508. Meta-data extraction can include extracting time stamps from the audio and image data and extracting GPS data.

The process can collect facts 510. The facts generated by the above processes can be collected and stored in a computer system.

The process can process the facts 512. Processing the facts may be context dependent. For example, the process can be part of a claim processing facility in which the mechanism for processing the facts were predetermined upon receiving the image and audio data. Alternatively, processing the facts may be context sensitive, in which the computer system analyzes the facts and determines what to do with them (for example, by using artificial intelligence and machine learning techniques).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (i.e., one or more modules of computer program instructions, encoded on computer storage mediums for execution by, or to control the operation of, data processing apparatus). A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The computer storage medium can be non-transitory.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example, a programmable processor, a computer, a system on a chip, or multiple ones, or combinations, of the foregoing. The apparatus can include special purpose logic circuitry (e.g., an FPGA (field programmable gate array) or an ASIC (application-specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural or object-oriented or functional languages, and it can be deployed in any form, including as a stand-alone program or as a module, component, subroutine, service, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any kind of digital, analog or quantum computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive, data from or transfer data to, or both, one or more mass storage devices for storing data (e.g., electronic, magnetic, magneto-optical disks, or optical disks), however, a computer need not have such devices. Moreover, a computer can be embedded in another device (e.g., a mobile telephone, a personal digital assistant (PDA), a mobile audio or video player, a game console, a GPS receiver, or a portable storage device (e.g., a universal serial bus (USB) flash drive)), to name just a few. Devices suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back-end component (e.g., as a data server), a middleware component (e.g., an application server), or a front-end component (e.g., a user computer having a graphical user interface or a Web browser through which a user can interact with an implementation of the subject matter described in this specification), or any combination of one or more such back-end, middleware, or front-end components. The components of the system can be interconnected by any form or medium of digital or optical data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
a memory configured to store instructions; and
one or more processors communicatively coupled to the memory, wherein the one or more processors are configured to execute the instructions and perform operations comprising:
receiving, from a mobile device, a data package comprising image data and audio data, wherein the image data and the audio data are acquired during the same time period by the mobile device, and wherein the audio data comprises speech describing a set of facts regarding an accident, and one or more weather conditions;
extracting metadata from the image data and the audio data, wherein the metadata comprises one or more time stamps and global positioning system (GPS) data;
identifying and detecting one or more objects and one or more object conditions within images, wherein the one or more object conditions comprises the one or more weather conditions and one or more road conditions;
deriving weather data based on the extracted metadata and the image data;
determining, via one or more machine learning algorithms, whether the image data comprises the one or more objects and the one or more object conditions representative of one or more components of the set of facts described in the speech, wherein the one or more objects comprise rain, snow, ice, or any combination thereof; and
authenticating an insurance claim based on the derived weather data corroborating the set of facts using speech recognition, the image data, and the metadata to confirm that the one or more objects and the one or more object conditions corroborate the weather data.

2. The system of claim 1, wherein the one or more components comprises a person, a road, a building, or any combination thereof.

3. The system of claim 1, the operations further comprising determining a likelihood of fraud based on the authentication.

4. The system of claim 3, the operations further comprising generating an alert in response to the likelihood of fraud exceeding a threshold value.

5. The system of claim 3, wherein corroborating the set of facts comprises:
generating a transcription of the speech;
extracting the set of facts from the transcription, wherein the set of facts is associated with the one or more time stamps, the GPS data, or both; and
determining that the set of facts corresponds to the one or more components.

6. The system of claim 1, the operations further comprising identifying a location of an event associated with the insurance claim based on the GPS data extracted from the metadata.

7. The system of claim 1, wherein the image data comprises the images, and wherein the images are representative of a vehicle, a damage to the vehicle, a location, a road, or any combination thereof.

8. The system of claim 1, the operations further comprising providing a set of questions to the mobile device, wherein the set of questions is associated with the audio data.

9. The system of claim 1, the operations further comprising providing a set of instructions to the mobile device, wherein the set of instructions is associated with the image data.

10. The system of claim 1, wherein the audio data is acquired simultaneously with the image data.

11. A method, comprising:
receiving, via a processing system, a data package comprising image data and audio data, wherein the audio data comprises speech describing a set of components, wherein the image data and the audio data are acquired by a mobile device during the same time period, and wherein the audio data comprises speech describing a set of facts regarding an accident and one or more weather conditions;
extracting, via the processing system, metadata from the image data and the audio data, wherein the metadata comprises one or more time stamps and global positioning systems (GPS) data;
identifying and detecting, via the processing system, one or more objects and one or more object conditions within images, wherein the one or more object conditions comprises the one or more weather conditions and one or more road conditions;
deriving, via the processing system, weather data based on the extracted metadata and the image data;
determining, via one or more machine learning algorithms, whether the image data comprises the one or more objects and the one or more object conditions representative of one or more components of the set of facts described in the speech, wherein the one or more objects comprise rain, snow, ice, or any combination thereof; and
authenticating, via the processing system, an insurance claim in response to the derived weather data corroborating the set of facts using speech recognition, the image data, and the metadata to confirm that the one or more objects and the one or more object conditions corroborate the weather data.

12. The method of claim 11, wherein the audio data is acquired simultaneously with the image data.

13. The method of claim 11, wherein the image data comprises a video recording.

14. The method of claim 11, further comprising receiving, via the processing system, a request to perform an activity based on the derived weather data.

15. The method of claim 11, further comprising determining, via the processing system, an activity to be performed based on the derived weather data.

16. The method of claim 15, wherein the activity comprises determining a likelihood of fraud based on the authentication.

17. A non-transitory computer storage medium comprising computer-executable instructions that, when executed by one or more processors, cause the one or more processors to perform operations comprising:
receiving, from a mobile device, a data package comprising image data and audio data, wherein the audio data comprises speech describing a set of facts regarding an accident and one or more weather conditions, wherein the image data and the audio data are acquired by the mobile device during the same time period;

extracting metadata from the image data and the audio data, wherein the metadata comprises one or more time stamps and global positioning system (GPS) data;

identifying and detecting one or more objects and one or more object conditions within images, wherein the one or more object conditions comprises the one or more weather conditions and one or more road conditions;

deriving weather data based on the extracted metadata and the image data;

determining, via one or more machine learning algorithms, whether the image data comprises the one or more objects and the one or more objects conditions representative of one or more components of the set of facts described in the speech, wherein the one or more objects comprise rain, snow, ice, or any combination thereof; and authenticating an insurance claim based on the derived weather data corroborating the set of facts using speech recognition, the image data, and the metadata to confirm that the one or more objects and the one or more object conditions corroborate the weather data.

18. The non-transitory computer storage medium of claim 17, wherein authenticating the insurance claim comprises determining that a location of an event associated with the insurance claim matches the GPS data extracted from the metadata.

* * * * *